United States Patent [19]

Kvasnikoff et al.

[11] Patent Number: 5,494,650
[45] Date of Patent: * Feb. 27, 1996

[54] PROCESS FOR IMPROVING THE SULPHUR YIELD OF A COMPLEX FOR PRODUCING SULPHUR FROM A SOUR GAS CONTAINING $H_2S$, THE SAID COMPLEX COMPRISING A SULPHUR PLANT AND THEN AN OXIDATION AND HYDROLYSIS UNIT FOLLOWED BY A PURIFICATION UNIT

[75] Inventors: Georges Kvasnikoff, Monein; Jean Nougayrede, Pau; André Philippe, Orthez, all of France

[73] Assignee: Societe Nationale Elf Aquitaine (Production), Courbevoie, France

[*] Notice: The portion of the term of this patent subsequent to Apr. 13, 2010, has been disclaimed.

[21] Appl. No.: 92,668

[22] Filed: Jul. 14, 1993

Related U.S. Application Data

[63] Continuation of Ser. No. 688,534, Jun. 14, 1991, abandoned.

[30] Foreign Application Priority Data

Oct. 19, 1989 [FR] France ................. 89 13704

[51] Int. Cl.[6] ................................................. C01B 17/16
[52] U.S. Cl. ................... 423/220; 423/222; 423/224; 423/573.1; 423/574.1; 423/576; 423/576.8
[58] Field of Search ....................... 423/572, 573.1, 423/574 R, 576, 576.8, 574.1, 220, 222, 224, 576.7

[56] References Cited

U.S. PATENT DOCUMENTS

| | | | |
|---|---|---|---|
| 2,581,135 | 1/1952 | Odell | 423/576.8 |
| 4,035,474 | 7/1977 | Kunkel et al. | 423/574 R |
| 4,123,507 | 10/1978 | Hass | 423/573 G |
| 4,243,647 | 1/1981 | Hass et al. | 423/573 G |
| 4,436,716 | 3/1984 | Kvasnikoff | 423/574 R |
| 4,532,119 | 7/1985 | Dupin | 423/230 |
| 4,552,247 | 11/1985 | Goar | 423/574 R |
| 4,836,999 | 6/1989 | Reed et al. | 423/574 R |
| 5,037,629 | 8/1991 | Berben et al. | 423/576.8 |
| 5,089,246 | 2/1992 | Schatz | 423/563 |
| 5,106,607 | 4/1992 | Chopin et al. | 423/564 |
| 5,202,107 | 4/1993 | Kvasnikoff et al. | 423/574 R |
| 5,262,135 | 11/1993 | Lell et al. | 423/220 |

FOREIGN PATENT DOCUMENTS

| | | | |
|---|---|---|---|
| 0094751 | 11/1983 | European Pat. Off. | 423/574 R |
| 2632626 | 12/1989 | France . | |
| 2143225 | 2/1985 | United Kingdom | 423/576.8 |
| 2192871 | 1/1988 | United Kingdom | 423/573 G |

*Primary Examiner*—Gary P. Straub
*Assistant Examiner*—Timothy C. Vanoy
*Attorney, Agent, or Firm*—Burgess, Ryan and Wayne

[57] ABSTRACT

A process is provided for the improvement of the sulphur yield of an assembly which produces sulphur from $H_2S$ and which consists of a sulphur plant (1), an oxidation and hydrolysis unit (2) and a purification unit (3). The sulphur plant in producing sulphur provides a residual gas which incorporates $H_2O$, COS and/or $CS_2$ and $H_2S$ and $SO_2$ in a mol ratio of $H_2S:SO_2>2:1$. The residual gas passes into the hydrolysis unit on a $H_2S$ oxidation and COS and $CS_2$ hydrolysis catalyst which functions between 180° C. and 700° C., in the presence of air, thus producing a residual gas free of COS and CS and incorporating $H_2S$ and $SO_2$ in a mol ratio which is kept equal to 2:1 by regulating the air flow. The residual gas is introduced into the purification unit in which $H_2S$ and $SO_2$ are made to react in order to produce sulphur and to obtain a purified residual gas.

22 Claims, 1 Drawing Sheet

PROCESS FOR IMPROVING THE SULPHUR YIELD OF A COMPLEX FOR PRODUCING SULPHUR FROM A SOUR GAS CONTAINING $H_2S$, THE SAID COMPLEX COMPRISING A SULPHUR PLANT AND THEN AN OXIDATION AND HYDROLYSIS UNIT FOLLOWED BY A PURIFICATION UNIT

This application is a continuation of application Ser. No. 688,534, filed Jun. 14, 1991, now abandoned.

BACKGROUND OF THE INVENTION

The invention relates to a process for improving the sulphur yield of a complex for producing sulphur from a sour gas containing $H_2S$, the said complex comprising a sulphur plant and then an oxidation and hydrolysis unit followed by a purification unit.

BACKGROUND ART

Production of sulphur from a sour gas containing $H_2S$ is generally carried out in what is conventionally called a sulphur plant, that is to say in a plant into which the said sour gas is introduced together with a controlled quantity of a gas containing free oxygen, and a controlled oxidation of the $H_2S$ in the sour gas is performed by means of the oxygen in the gas containing free oxygen to produce sulphur, and at the exit of which there is removed a residual gas containing steam and, in an overall quantity of approximately between 0.2 and 6% by volume, sulphur compounds including $H_2S$, $SO_2$ and vaporised and/or vesicular sulphur. In most sulphur plants, controlled oxidation of the $H_2S$ in the sour gas is carried out to produce a gaseous effluent containing $H_2S$ and $SO_2$ and optionally elemental sulphur, and the said gaseous effluent, after separation of the sulphur which it may contain by condensation, is passed in contact with a Claus catalyst arranged in one or more catalytic oxidation zones operating at temperatures above the dew point of the sulphur present in the effluent to form a new quantity of sulphur by reaction between $H_2S$ and $SO_2$, the said sulphur being separated off by condensation.

The sulphur compounds present in the residual gas originating from the sulphur plant frequently contain at least one of the derivatives of COS and $CS_2$ in addition to $H_2S$ and $SO_2$. These derivatives COS and $CS_2$ may already exist in the sour gas charge containing $H_2S$ delivered to the sulphur plant and/or may be formed during the oxidation of $H_2S$ to sulphur because of the presence of $CO_2$ and/or of hydrocarbons in the sour gas.

The residual gas discharged from the sulphur plant is commonly treated to lower its overall content of sulphur compounds as much as possible with the aim of enabling it to be discharged to the atmosphere, after it has been incinerated, conforming to the standards imposed by legislation concerned with pollution, and simultaneously to recover these sulphur compounds in a form which contributes to increasing the yield of reclaimable products obtained from the gas treated in the sulphur plant.

In various techniques developed for the treatment of a residual gas from a sulphur plant, the said residual gas, which is at a temperature of less than 160° C., is conveyed to a purification unit in which the $H_2S$ and $SO_2$ compounds present in the residual gas react together to form sulphur, the said reaction being performed at a temperature below the dew point of the sulphur formed, and at the exit of which a purified residual gas is obtained which is discharged to the .atmosphere after having been subjected to incineration.

In such purification techniques the organic sulphur compounds COS and $CS_2$ are in practice not retained in the purification unit and are wholly or partially found again in the purified residual gas directed towards incineration, and this gives rise to significant losses of sulphur which limit the sulphur yield of the complex consisting of the sulphur plant and of the purification unit to values of approximately 99%, the losses of sulphur resulting from subjecting the compounds COS and $CS_2$ to incineration representing a fraction of the sulphur yield of the said complex which can vary from approximately 0.1 to 1%.

Furthermore, since the purification unit generally contains a catalyst for the Claus reaction, $2H_2S+SO_2=3/n\ S_n+2H_2O$, which does not permit a complete removal of the $H_2S$ and of the $SO_2$ reacting in contact with the said catalyst, a certain quantity of $H_2S$ and of $SO_2$ resulting from this incomplete catalytic reaction is also found again in the purified residual inert gas directed towards incineration.

It can be seen, furthermore, that any excess of either of these two reactants in relation to the stoichiometry of the Claus reaction is found again in the purified residual gas forming the gaseous effluent from the purification unit. In practice such an excess of $H_2S$ or $SO_2$ can exist as a result of the imperfect control of the sulphur plant, intended to maintain a molar ratio $H_2S:SO_2$ at 2:1, a value corresponding to the stoichiometry of the Claus reaction, in the gaseous effluent originating from the sulphur plant and directed towards the purification unit. In fact, most of the time control of a sulphur plant is performed by measuring, generally continuously, the quantities of $H_2S$ and $SO_2$ in the gaseous effluent leaving the sulphur plant and using the results of this measurement to determine the adjustment of the flow of the gas containing free oxygen, which is introduced at the head of the sulphur plant to perform the controlled oxidation of $H_2S$ in the sour gas to sulphur. A number of zones, including at least two reaction zones, separate the point of measurement of the quantities of $H_2S$ and of $SO_2$ from the point of injection of the gas containing free oxygen into the sulphur plant and, consequently, the response time of the ,control process, that is to say the time separating the said measurement and the corresponding flow adjustment, can reach some tens of seconds, resulting in an imperfect control which is reflected in an $H_2S:SO_2$ molar ratio other than 2:1 at the exit of the sulphur plant.

According to plants which combine a purification unit with a sulphur plant it is estimated that the losses of $H_2S$ or $SO_2$ at the exit of the purification unit which result from the imperfect control of the sulphur plant can momentarily represent from 0.1 to 0.3 points of the plant yield over a relatively long period.

To summarise, the residual gas originating from the purification unit of a sulphur production complex which comprises a sulphur plant followed by a purification unit employing the Claus reaction and which processes a sour gas containing $H_2S$ therefore contains a certain residual concentration of the sulphur compounds $H_2S$, $SO_2$, COS and $CS_2$ which are then incinerated to $SO_2$ and discharged to the atmosphere. These residual sulphur compounds at the exit of the purification unit, which are not recovered, constitute what is conventionally called the sulphur losses of the abovementioned sulphur production complex, these losses being subdivided, as explained above, into losses of COS and $CS_2$, losses of $H_2S$ and $SO_2$ due to the fact that the yield of the Claus reaction in the purification unit is not 100%, and losses of $H_2S$ or $SO_2$ resulting from the imperfect control of the sulphur plant, which means that the $H_2S:SO_2$ molar ratio at the exit of the said sulphur plant or, which amounts to the same thing, at the entry of the purification unit, is not continuously equal to 2.

In French Patent Application No. 88/07,649 of 8 Jun. 1988 in the name of the Applicant Company a process is proposed which makes it possible to improve the sulphur yield of a sulphur production complex of the abovementioned type by ensuring a virtually complete recovery of the compounds COS and $CS_2$ in the form of sulphur, and which concurrently also lowers the concentration of the sulphur-containing products discharged to the atmosphere and improves the quality of the discharges which are free from COS and $CS_2$.

The said process consists in bringing the residual gas originating from the sulphur plant into contact with a catalyst of hydrolysis of the compounds COS and $CS_2$ to $H_2S$ operating at a sufficient temperature to produce a hydrolysed residual gas containing $H_2S$ and $SO_2$ and substantially free from COS and $CS_2$ and in introducing the hydrolysed residual gas into the purification unit after its temperature has been brought to the value required for processing in the said unit, while continuously adjusting the $H_2S:SO_2$ molar ratio in the said hydrolysed residual gas to a value substantially equal to 2:1 at the entry of the purification unit by varying the ratio of the flow rates of the sour gas and of gas containing free oxygen which are introduced into the sulphur plant.

An improvement to the abovementioned process has now been found, which makes it possible to improve the quality of the control of the molar ratio $H_2S:SO_2$ in the residual gas entering the purification unit and generally to limit or to reduce the $H_2S$ and $SO_2$ content of the said residual gas, resulting in a lower content of $H_2S$ and $SO_2$ in the purified residual gas originating from the purification unit and consequently in an increase in the sulphur yield of the sulphur production complex.

SUMMARY OF THE INVENTION

The process according to the invention for improving the sulphur yield of a complex producing sulphur from a sour gas containing $H_2S$, the said complex comprising a sulphur plant into which the said sour gas is introduced together with a controlled quantity of a gas containing free oxygen and in which a controlled oxidation of the $H_2S$ in the sour gas by means of the oxygen in the gas containing free oxygen is performed to produce sulphur and at the exit of which there is discharged a residual gas containing steam and, in an overall quantity of approximately between 0.2 and 6% by volume, sulphur compounds comprising $H_2S$, $SO_2$ and at least one of the derivatives COS and $CS_2$, an oxidation and hydrolysis unit in which the residual gas originating from the sulphur plant is brought into contact with a catalyst of hydrolysis of the compounds COS and $CS_2$ to $H_2S$ while operating at a sufficient temperature to produce a hydrolysed residual gas containing $H_2S$ and $SO_2$ and substantially free from COS and $CS_2$ and finally a purification unit through which the residual gas originating from the oxidation and hydrolysis unit is passed after the temperature of the said gas has been brought to the value required for its passage through the purification unit and while maintaining the molar ratio $H_2S:SO_2$ in the residual gas entering the said purification unit at a value substantially equal to 2:1, and the compounds $H_2S$ and $SO_2$ which it contains being made to react together to form sulphur and to obtain a purified residual gas at the exit of the purification unit, is characterised in that the $H_2S:SO_2$ molar ratio in the residual gas originating from the sulphur plant and entering the oxidation and hydrolysis unit is maintained at a value equal to or higher than 2:1 by varying the ratio of the flow rates of sour gas and of gas containing free oxygen which are introduced into the sulphur plant, a gas stream containing free oxygen is introduced into the oxidation and hydrolysis unit and an oxidation of $H_2S$ to $SO_2$ and optionally to sulphur is performed in the said unit by means of the said flow in contact with a catalyst for oxidation of the $H_2S$ present in this unit, and the $H_2S:SO_2$ molar ratio in the residual gas entering the purification unit is maintained at a value substantially equal to 2:1 by varying the flow rate of the stream containing free oxygen introduced into the oxidation and hydrolysis unit.

DESCRIPTION OF THE PREFERRED EMBODIMENTS

Figure 1:
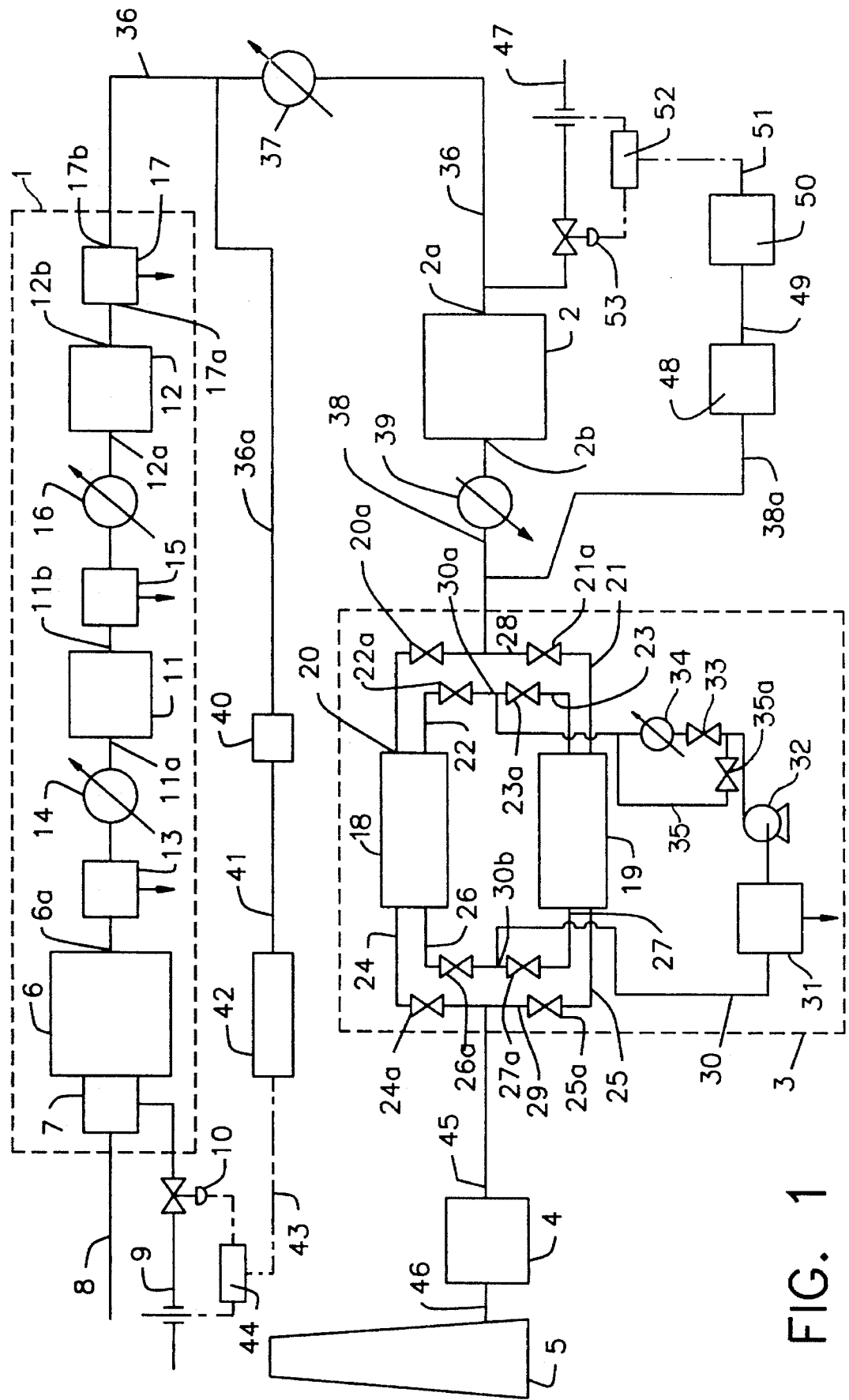

The temperature for carrying out the reactions of oxidation of $H_2S$ and of hydrolysis of the compounds COS and $CS_2$ in the oxidation and hydrolysis unit is advantageously between 180° C. and 700° C., the said temperature being preferably chosen between 250° C. and 400° C.

The oxidation and hydrolysis unit may contain two types of catalysts, namely a catalyst of oxidation of $H_2S$ with oxygen and a catalyst of hydrolysis of the compounds COS and $CS_2$ to $H_2S$, which may be employed as a mixture or in the form of separate beds. Advantageously, a single catalyst is used, chosen from the catalysts which are capable of simultaneously promoting the two abovementioned reactions.

It is possible, in particular, to employ catalysts based on alumina, that is to say those made up of a material containing, by weight, at least 50% and advantageously at least 90% of activated alumina, and especially catalysts consisting of activated aluminas chosen from the activated aluminas employed to promote the Claus reaction between $H_2S$ and $SO_2$ which gives sulphur. It is also possible to employ catalysts resulting from the combination of at least one compound of a metal chosen from Fe, Ni, Co, Cu, Zn, Cr and Mo with an alumina and/or silica support, such as those described especially in reference FR-A-2,327,960. Also suitable as alumina-based catalysts are the catalysts resulting from the combination of at least one compound of a metal chosen from Fe, Cu, Cd, Zn, Cr, Mo, W, V, Co, Ni and Bi and optionally of at least one compound of a noble metal such as Pd, Pt, Ir and Rh with a support consisting of an activated alumina heat-stabilised especially by a small quantity of at least one rare-earth oxide, which are described in reference FR-A-2,540,092.

It is also possible, in the case of oxidation and hydrolysis, to employ catalysts similar to those resulting from the combination of at least one compound of a metal chosen from Fe, Cu, Cd, Zn, Cr, Mo, W, V, Co, Ni and Bi and optionally of at least one compound of a noble metal such as Pd, Pt, Ir and Rh with a silica and/or titanium oxide support and which are presented in reference FR-A-2,511,663.

The alumina-based catalysts advantageously have specific surfaces, measured by the nitrogen adsorption method known as the BET method, ranging from 5 $m^2/g$ to 400 $m^2/g$ and preferably from 40 $m^2/g$ to 250 $m^2/g$.

Also suitable as oxidation and hydrolysis catalysts are the catalysts containing titanium oxide and in particular catalysts consisting of titanium oxide or catalysts containing a mixture of titanium oxide and of a sulphate of an alkaline-earth metal chosen from calcium, strontium, barium and magnesium or, again, catalysts based on titanium oxide and on a support such as silica, alumina or a zeolite. In the catalysts based on titanium oxide and on an alkaline-earth metal sulphate, the ratio of the weight proportion of titanium oxide, expressed as $TiO_2$, to the weight proportion of the alkaline-earth metal sulphate in the calcined catalyst may range from 99:1 to 60:40 and preferably from 99:1 to 80:20. The oxidation and hydrolysis catalysts based on titanium oxide advantageously have specific surfaces, measured by the BET method, of between 5 and 400 $m^2/g$ and preferably between 10 and 250 $m^2/g$. Catalysts containing titanium oxide can be obtained as described, for example, in reference FR-A-2,481,145. To obtain catalysts containing titanium oxide and an alkaline-earth metal sulphate it is possible to use either of the techniques of preparation taught by reference EP-A-0,060,741.

The residual gas originating from the sulphur plant and the gas stream containing free oxygen, which are delivered to the oxidation and hydrolysis unit, may be introduced into the said unit separately. It is preferable, however, first of all to produce a mixture of the said gases and then to introduce the said mixture into the oxidation and hydrolysis unit.

The residence time of the reaction mixture containing the residual gas originating from the sulphur plant and the gas stream containing free oxygen in contact with the catalyst present in the oxidation and hydrolysis unit may range from 0.5 to 10 seconds and in particular from 1 to 6 seconds, these values being given for standard conditions of pressure and temperature.

To bring the residual gas originating from the oxidation and hydrolysis unit to the temperature required for passing it through the purification unit it is possible to operate advantageously using an indirect heat exchange with a fluid at an appropriate temperature.

As indicated above, in the process according to the invention the $H_2S:SO_2$ molar ratio in the residual gas originating from the sulphur plant and delivered to the oxidation and hydrolysis unit is maintained at a value equal to or higher than 2:1, it being possible for the said value to be chosen proportionately higher the lower the $H_2S$ content of the residual gas originating from the sulphur plant, and does not result, during the oxidation of $H_2S$ in the oxidation and hydrolysis unit, in a temperature rise liable to damage the catalyst present in the said unit.

The maintenance of the $H_2S:SO_2$ molar ratio at a value equal to or higher than 2:1 in the residual gas originating from the sulphur plant and delivered to the oxidation and hydrolysis unit may be obtained by making use of the various known methods of control for maintaining the $H_2S:SO_2$ molar ratio at a predetermined value in the residual gases from a sulphur plant by varying the ratio of the flow rates of sour gas and of gas containing free oxygen which are introduced into the sulphur plant, the said variation being advantageously obtained by keeping the flow rate of the sour gas delivered to the sulphur plant constant and varying the flow rate of gas containing free oxygen.

In most of these control methods an analysis of a sample of the residual gas is carried out to determine its molar contents of $H_2S$ and $SO_2$ and to produce, starting with the said contents, a quantity representing the instantaneous value of the $H_2S:SO_2$ molar ratio in the residual gas, then a quantity representing the correction flow rate of the gas containing free oxygen is established to bring the said instantaneous value of the $H_2S:SO_2$ molar ratio to the predetermined value and the quantity thus established is employed to adjust the flow rate of the gas containing free oxygen which is introduced into the sulphur plant, this flow-rate adjustment being performed either on the total flow rate of gas containing free oxygen or only on a small additional flow rate which is added to a main flow rate which is greater and proportional to the quantity of $H_2S$ present in the sour gas. The technique for analysing the sample of residual gas which is used in these control methods can be, for example, a technique of analysis by gas phase chromatography (US-A-3,026,184 and FR-A-2,118,365), a technique of analysis by absorption in the ultraviolet (The Oil and Gas Journal, 10 Aug. 1970, pages 155 to 157) or else a technique of analysis by interference spectrometry (FR-A-2,420,754).

Maintenance of the $H_2S:SO_2$ molar ratio at a value substantially equal to 2:1 in the residual gas entering the purification unit by varying the flow rate of the gas stream containing free oxygen introduced into the oxidation and hydrolysis unit may be obtained by employing the control methods which are used, as indicated above, in the case of sulphur plants, the adjustment of the flow rate of the gas stream being performed on the whole flow rate of the said stream.

The quality of the control of the flow rate of the gas stream containing free oxygen introduced into the oxidation and hydrolysis unit is practically perfect because, on the one hand, the response time of the system is only a few seconds and, on the other hand, the flow rate of the said gas stream to be controlled is low and can therefore be adjusted perfectly.

The gas containing free oxygen which is introduced into the sulphur plant to perform the controlled oxidation of the $H_2S$ in the sour gas, and the gas stream containing free oxygen which is injected into the oxidation and hydrolysis unit are generally air, although it is possible to employ pure oxygen or else oxygen-enriched air or even mixtures, in various proportions, of oxygen and of one or more inert gases other than nitrogen.

In the process according to the invention the term sulphur plant refers to any plant into which the sour gas containing $H_2S$ is introduced, together with a controlled quantity of a gas containing free oxygen and in which a controlled oxidation of the $H_2S$ in the sour gas is performed by the oxygen in the gas containing free oxygen to produce sulphur and at the exit of which a residual gas which has the characteristics defined above is also discharged. In particular, the sulphur plant may be a Claus sulphur plant in which a combustion of a fraction of the $H_2S$ in the sour gas is performed in a combustion zone operating at elevated temperature to produce a gaseous effluent containing $H_2S$ and $SO_2$ and possibly elemental sulphur and the said gaseous effluent is passed, after separation of the sulphur which it may contain by condensation, in contact with a Claus catalyst arranged in one or more catalytic oxidation zones operating at temperatures above the dew point of the sulphur present in the effluent to form a new quantity of sulphur by reaction between $H_2S$ and $SO_2$, the said sulphur being separated by condensation after each catalytic stage.

In such a Claus sulphur plant the partial combustion of the $H_2S$ in the sour gas to form the effluent containing $H_2S$ and $SO_2$ is carried out at temperatures of between 900° C. and 1600° C. and the reaction between $H_2S$ and $SO_2$ in contact with the Claus catalyst operating at temperatures above the dew point of the sulphur present in the reaction mixture is performed at temperatures of between 180° C. and 450° C.

in at least one catalytic zone and preferably in a plurality of catalytic zones arranged in series. In this latter case, the operating temperatures of the various catalytic zones decrease from one catalytic zone to the next. After each of the reaction stages the sulphur produced present in the reaction mixture is separated off by condensation and the reaction mixture, substantially devoid of sulphur, is heated to the temperature chosen for the subsequent reaction stage. The temperature of the residual gas originating from the sulphur plant corresponds substantially to the temperature to which the reaction mixture produced during the last reaction stage in the sulphur plant has been cooled to condense the sulphur which it contains, the said temperature being generally between 120° C. and 160° C.

The purification unit in which the oxidised and hydrolysed residual gas is processed may consist of any plant which makes it possible to produce sulphur by reaction between $H_2S$ and $SO_2$ and to obtain a purified residual gas substantially free from sulphur compounds such as $SO_2$ and $H_2S$. The purification unit may be, in particular, a purification unit in which the sulphur-forming reaction between $H_2S$ and $SO_2$ is performed in contact with a Claus catalyst at temperatures above the dew point of the sulphur formed or, on the contrary, at temperatures below the said dew point or else first of all at temperatures above the dew point of the sulphur formed and then at temperatures below the dew point of the sulphur formed.

In particular, it is possible to use a catalytic purification unit in which the hydrolysed residual gas, at a temperature of less than 160° C., is brought into contact with a Claus catalyst to form sulphur by reaction between $H_2S$ and $SO_2$, the said contact being produced at a temperature below the dew point of the sulphur formed, for example between 100° C. and 180° C., in order that this sulphur may deposit on the catalyst, the sulphur-charged catalyst being subjected at regular intervals to regeneration by purging with a nonoxidising gas between 200° C. and 500° C. to vaporise the sulphur which it contains, and then to cooling by means of an inert gas at a temperature of less than 160° C. to the temperature required for being brought again into contact with the residual gas. Examples of catalytic purification units operating as indicated above are described in particular in references FR-A-2,180,473 and FR-A-2,224,196.

The purified residual gas leaving the purification unit is generally subjected to thermal or catalytic incineration, to convert into $SO_2$ all the sulphur compounds which it may still contain in a very small overall quantity, before being sent to the atmosphere. The hydrolysis according to the invention of the COS and $CS_2$ compounds before the purification unit facilitates the thermal or catalytic incineration of the purified residual gas originating from the said unit. In fact, since the said purified gas no longer contains any COS or $CS_2$, its incineration can be performed at much lower temperatures, and this is accompanied by a saving in the fuel gas needed for this incineration.

The catalyst employed in the Claus sulphur plant, and also the catalyst employed in the catalytic purification unit making use of a Claus catalyst, may be chosen from products such as bauxite, alumina, silica and natural or synthetic zeolites, which are commonly employed to promote the sulphur-forming reaction between $H_2S$ and $SO_2$.

The invention will be understood better on reading the description, given below, of one of its embodiments employing the plant shown in the figure of the attached drawing.

This plant combines in series a Claus sulphur plant 1, an oxidation and hydrolysis reactor 2, a catalytic purification unit 3 and an incinerator 4 connected to a stack 5.

The sulphur plant 1 comprises, on the one hand, a combustion chamber 6 which includes a burner 7 provided with a sour gas delivery conduit 8 and an air delivery conduit 9, the latter conduit being equipped with a controllable-opening valve 10 which has an exit 6a for the gases and, on the other hand, a first catalytic converter 11 and a second catalytic converter 12, each of which includes an entry, 11a and 12a respectively, an exit, 11b and 12b respectively, which are separated by a stationary bed of a Claus catalyst. The combustion chamber 6 and the catalytic converters 11 and 12 are mounted in series so that the exit 6a of the combustion chamber is connected to the entry 11a of the first converter 11 through a first sulphur condenser 13 and then a first heater 14, so that the exit 11b of the said first converter is connected to the entry 12a of the second converter 12 through a second sulphur condenser 15 and then a second heater 16 and so that the exit 12b of the said second converter is connected to the entry 17a of a third sulphur condenser 17 which has an exit 17b for the gases, forming the exit of the sulphur plant.

The catalytic purification unit 3 includes two catalytic reactors 18 and 19 mounted in parallel, each having, on the one hand, an entry conduit for the gas to be purified, 20 and 21 respectively, the said entry conduit being provided with a valve, 20a and 21a respectively, and an injection conduit, 22 and 23 respectively, for a regenerating and cooling gas, the said injection conduit being provided with a valve, 22a and 23a respectively, and, on the other hand, an exit conduit for the purified gas, 24 and 25 respectively, the said exit conduit being provided with a valve 24a and 25a respectively and a discharge conduit, 26 and 27 respectively, for a regeneration and cooling effluent, the said discharge conduit being provided with a valve, 26a and 27a respectively. The entry conduits, 20 and 21 respectively, of the catalytic reactors 18 and 19 are connected through the corresponding valves 20a and 21a to a conduit 28 forming the entry of the catalytic purification unit 3. Similarly, the exit conduits, 24 and 25 respectively, of the said catalytic reactors 18 and 19 are connected through the corresponding valves 24a and 25a to a conduit 29 forming the exit of the catalytic purification unit 3. In each of the catalytic reactors 18 and 19 the orifices of the entry and injection conduits are separated from the orifices of the exit and discharge conduits by a stationary bed of a Claus catalyst. The injection conduits 22 and 23 of the reactors 18 and 19 are mounted in parallel, through the corresponding valves 22a and 23a, at one of the ends 30a of a conduit 30 for circulating a regenerating and cooling gas and the discharge conduits 26 and 27 of the said reactors are also mounted in parallel at the other end 30b of the said conduit 30. In this conduit 30 there are mounted, going from its end 30b to its end 30a, a sulphur condenser 31, a blower 32, a valve 33, a heater 34 and a branch 35 provided with a valve 35a, the ends of the said branch opening into the conduit 30, one between the blower 32 and the valve 33 and the other downstream of the heater 34. The blower 32 is mounted in the circuit 30 so that its suction orifice is connected to the sulphur condenser 31. The conduit 29 forming the exit of the purification unit 3 is connected via a conduit 45 to the incinerator 4, itself connected via a conduit 46 to the stack 5. In addition, a first pipe, not shown, joins the conduit 38 delivering the oxidised and hydrolysed and cooled residual gas to the purification unit, to the circuit 30, at a point of the latter situated between the condenser 31 and the blower 32, and a second pipe, also not shown, connects the said conduit 38, downstream of the point where this conduit 38 joins the first pipe, to the conduit 30 at a point of the latter situated between the blower 32 and the valve 33.

The oxidation and hydrolysis reactor 2 includes an entry 2a and an exit 2b which are separated from each other by a stationary bed of a catalyst of oxidation of $H_2S$ and of hydrolysis of COS and $CS_2$. The exit 17b of the sulphur plant 1 is connected via a conduit 36, through a heater 37 of the indirect heat exchanger type, to the entry 2a of the oxidation and hydrolysis reactor and the exit 2b of the said reactor is connected via a conduit 38, through a cooling system 39 of the indirect heat exchanger type, to the conduit 28 forming the entry of the purification unit. An air-delivery conduit 47 is mounted as a branch on the conduit 36 upstream of the entry 2a of the oxidation and hydrolysis unit 2, the said conduit 47 being equipped with a controllable-opening valve 53.

An analyser 40, for example of the interference spectrometer type, is mounted by means of a branch 36a on the conduit 36 upstream of the cooling system 37, the said analyser being designed to determine the molar contents of $H_2S$ and $SO_2$ of the gas travelling in the conduit 36 and to output a signal 41 representing the instantaneous value of the $H_2S:SO_2$ molar ratio in the said gas.

The signal 41 is fed to a calculator 42 which produces a signal 43 representing the correction air flow to return the instantaneous value of the $H_2S:SO_2$ molar ratio to a set value, the said signal. 43 being fed to a flow controller 44 which controls the opening of the valve 10, and this ensures the adjustment of the air flow introduced into the sulphur plant via the conduit 9.

Similarly, an analyser 48, for example of the interference spectrometer type, is mounted by means of a branch 38a on the conduit 38 downstream of the cooling system 39, the said analyser being designed to determine the molar contents of $H_2S$ and $SO_2$ of the gas travelling in the conduit 38 and to output a signal 49 representing the instantaneous value of the $H_2S:SO_2$ molar ratio in the said gas. The signal 49 is fed to a calculator 50 which produces a signal 51 representing the correction air flow to bring the instantaneous value of the $H_2S:SO_2$ molar ratio to a set value, in this case the value 2:1 in the process according to the invention, the said signal 51 being fed to a flow controller 52 which controls the opening of the valve 53, and this ensures the adjustment of the air flow introduced into the oxidation and hydrolysis reactor 2 via the conduit 47.

The way in which the process takes place in this plant can be outlined as follows.

It is assumed that the reactor 18 is in a reaction stage and that the reactor 19 is in a regeneration stage, the valves 20a, 24a, 23a, 27a and 33 being open while the valves 21a, 22a, 25a, 26a and 35a are closed.

In the sulphur plant 1 the sour gas containing $H_2S$ introduced via the conduit 9 into the burner 7 of the combustion chamber 6 undergoes a partial combustion, forming a gaseous effluent containing $H_2S$ and $SO_2$ and elemental sulphur.

This effluent, after separation of the sulphur which it contains in the first sulphur condenser 13, is heated in the first heater 14 and enters the first converter 11. In contact with the Claus catalyst present in this converter the compounds $H_2S$ and $SO_2$ present in the gaseous effluent react to form sulphur. The reaction mixture originating from the converter 11, after separation of the sulphur which it contains in the second condenser 15 and then heating in the second heater 16, enters the second converter 12 where a new quantity of sulphur is formed by catalytic reaction between $H_2S$ and $SO_2$. The reaction mixture originating from the converter 12 is freed from the sulphur which it contains in the third condenser 17. A residual gas containing steam and, in an overall quantity of less than approximately 6% by volume, sulphur compounds comprising $H_2S$, $SO_2$, COS and/or $CS_2$ and a very small quantity of vaporised and/or vesicular sulphur, is discharged via the gas exit 17b of the said condenser, which forms the exit of the sulphur plant.

After the residual gas originating from the sulphur plant has been heated to the appropriate temperature in the heater 37, air delivered via the conduit 47 is added to it and the mixture obtained enters the oxidation and hydrolysis reactor 2 in which the compounds COS and $CS_2$ present in the said residual gas are hydrolysed to $H_2S$ in contact with the catalyst present in the reactor 2, while, also in contact with the said catalyst, a fraction of the $H_2S$ present in the said residual gas is oxidised to $SO_2$ and possibly to sulphur by the oxygen in the air injected via the conduit 47. A hydrolysed and oxidised residual gas containing $H_2S$ and $SO_2$, possibly vaporised sulphur and substantially free from COS and $CS_2$, is discharged via the exit 2b of the oxidation and hydrolysis reactor.

The oxygen in the air injected via the conduit 47 is entirely consumed in the oxidation and hydrolysis reactor 2. After the oxidised and hydrolysed residual gas has been cooled to the appropriate temperature in the cooling system 39, it is introduced via the conduit 38 into the conduit 28 of the catalytic purification unit, which forms the entry of the said unit.

The oxidised and hydrolysed residual gas flowing in the conduit 28 is introduced into the catalytic reactor 18, in which the compounds $H_2S$ and $SO_2$ present in the said residual gas react with each other to form sulphur. The temperature of the gas stream brought into contact with the Claus catalyst present in the reactor 18 is such that the sulphur formed is deposited on the catalyst. A purified residual gas with an extremely low content of sulphur compounds leaves via the conduit 24 of the reactor 18 and is directed, through the valve 24a, the conduit 29 and the conduit 45, into the incinerator 4, the incinerated gas being conveyed to the stack 5 via the conduit 46 to be discharged to the atmosphere.

A stream of purging gas, conveyed in the regeneration circuit 30 by the action of the blower 32 is heated in the heater 34 to the temperature required for regenerating the Claus catalyst on which sulphur has deposited. The heated gas stream is introduced into the reactor 19 via the conduit 23 through the valve 23a and purges the sulphur-charged Claus catalyst present in the said reactor. The stream of purging gas entraining the vaporised sulphur leaves the reactor 19 via the conduit 27 and flows through the valve 27a and the conduit 30 to the sulphur condenser 31, in which most of the sulphur is separated off by condensation. At the exit of the condenser 31 the stream of purging gas is picked up again by the blower 32 to be delivered to the entry of the reactor 19 through the heater 34.

After a sufficient period of purging of the catalyst present in the reactor 19 with the hot purging gas originating from the heater 34 to remove completely the sulphur deposited on the catalyst and thus to regenerate the said catalyst, the valve 35a is opened and the valve 33 is closed so as to bypass the heater 34 and to lower the temperature of the purging gas to a value of less than approximately 160° C., and the purging is continued for a sufficient period to cool the regenerated catalyst present in the reactor 19. When the said catalyst has been cooled to a suitable temperature allowing the catalyst to be brought into contact with the gas stream from the oxidation and hydrolysis reactor 2, the functions performed by the reactors 18 and 19 are interchanged, that is to say that the reactor 19 is brought into a Claus reaction stage and the reactor 18 into a regeneration/cooling stage. To do this, valves 20a, 23a, 24a, 27a and 35a are closed and valves 21a, 22a, 25a, 26a and 33 are opened and then, during the cooling stage, the valve 33 is closed and the valve 35a is opened. During the transition period when the functions of the reactors 18 and 19 are interchanged the purging gas is circulated through a conduit which is not shown, bypassing the said reactors. The purging gas circulating in the circuit 30 is taken, via the first pipe, from the cooled oxidised and hydrolysed residual gas delivered to the catalytic purification unit via the conduit 38. The second pipe allows any necessary purging of the circuit 30 to be carried out.

The analyser 40 of the control system consisting of the said analyser, the calculator 42 and the flow controller 44 continuously determines the molar contents of $H_2S$ and $SO_2$ of the residual gas originating from the sulphur plant and flowing in the conduit 36 upstream of the cooling system 37 arranged following the said sulphur plant and outputs a signal 41 representing the instantaneous value of the $H_2S:SO_2$ molar ratio in the said residual gas.

Starting with the signal 41, the calculator 42 produces a signal 43 representing the correction air flow injected into the sulphur plant to bring the instantaneous value of the $H_2S:SO_2$ molar ratio in the residual gas entering the oxidation and hydrolysis unit 2 to the set value. Responding to the signal 43 which it receives from the calculator 42, the controller 44 controls the opening of the valve 10 mounted in the air-delivery conduit 9 of the sulphur plant 1 and thus varies the air flow introduced into the said sulphur plant by a quantity which allows the $H_2S:SO_2$ molar ratio in the residual gas entering the oxidation and hydrolysis reactor 2 to be maintained at the set value.

Similarly, the analyser 48 of the control system consisting of the said analyser, the calculator 50 and the flow controller 52 continuously determines the molar contents of $H_2S$ and $SO_2$ of the oxidised and hydrolysed residual gas flowing in the conduit 38 downstream of the cooling system 39 arranged following the reactor 2 and outputs a signal 49 representing the instantaneous value of the $H_2S:SO_2$ molar ratio in the :said residual gas. Starting with the signal 49, the calculator 50 produces a signal 51 representing the correction air flow injected into the conduit 36 via the conduit 47 at the entry of the reactor 2, to bring the instantaneous value of the $H_2S:SO_2$ molar ratio in the residual gas entering the catalytic purification unit 3 to the set value of 2:1. Responding to the signal 51 which it receives from the calculator 50, the controller 52 controls the opening of the valve 53 mounted in the conduit 47 and thus varies the air flow introduced into the oxidation and hydrolysis reactor 2, by a quantity which allows the $H_2S:SO_2$ molar ratio in the hydrolysed and oxidised residual gas entering the catalytic purification unit 3 to be maintained at the value of 2:1.

To supplement the description of the process according to the invention which has just been given, an example of use of the said process is given below, no limitation being implied.

EXAMPLE

Using a plant similar to that shown diagrammatically in the figure of the attached drawing and operating as described above, sulphur was produced from a sour gas containing, by volume, 80% of $H_2S$, 4% of $H_2O$, 15.2% of $CO_2$, 0.73% of $CH_4$, 0.05% of $C_2H_6$ and 0.02% of $C_6$–$C_7$ linear alkanes.

The catalyst placed in the hydrolysis reactor 2 consisted of extrudates, 4 mm in diameter, of titanium oxide containing 10% by weight of calcium sulphate.

The Claus catalyst present in the catalytic converters 11 and 12 of the sulphur plant 1 and in the reactors 18 and 19 of the catalytic purification unit 3 consisted of beads, 2 to 5 mm in diameter, of an alumina with a specific area of approximately 240 m$^2$/g.

In the sulphur plant 1, the combustion chamber 6 and the catalytic converters 11 and 12 operated at temperatures of approximately 1150° C., 300° C. and 240° C. respectively.

A residual gas at a temperature of 132° C. and an absolute pressure of 1.15 bars was discharged at the exit 17b of the sulphur plant.

This residual gas had the following composition in percentage by volume, apart from vaporised and vesicular sulphur.

| | |
|---|---|
| $N_2$ | 56.06 |
| $H_2O$ | 33.92 |
| $H_2S$ | 0.76 |
| $H_2$ | 2.49 |
| CO | 0.67 |
| $SO_2$ | 0.32 |
| $CO_2$ | 5.69 |
| COS | 0.05 |
| $CS_2$ | 0.04 |

The sulphur recovery yield of the sulphur plant 1 was 96%.

The residual gas discharged from the sulphur plant was heated to 290° C. in the heater 37 and then had added to it a small air flow representing approximately 1% of the air flow entering the sulphur plant, and the mixture obtained entered the oxidation and hydrolysis reactor 2 at the said temperature. The residence time of the reaction mixture in contact with the catalyst present in the said reactor 2 was 3 seconds under standard pressure and temperature conditions.

The oxidised and hydrolysed residual gas leaving the reactor 2 now contained only traces of COS and $CS_2$, the degree of hydrolysis of these compounds being higher than 99%, and its overall content of $H_2S$ and $SO_2$ was lower than that which could be expected merely from the reactions of hydrolysis of COS and $CS_2$ and of oxidation of a fraction of $H_2S$ to $SO_2$, which shows that sulphur was also formed by the Claus reaction

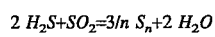

$$2\ H_2S + SO_2 = 3/n\ S_n + 2\ H_2O$$

The temperature at the exit of the reactor 2 was 303° C., the oxidised and hydrolysed residual gas originating from the said reactor no longer containing any oxygen.

The oxidised and hydrolysed residual gas was cooled to 130° C. by passing through the cooling system 39 and was then injected, at this temperature and with an $H_2S:SO_2$ molar ratio maintained at the value 2:1 by the control system acting on the valve 53 mounted in the conduit 47, into that of the catalytic reactors 18 and 19 of the catalytic purification unit 3 operating in a Claus reaction stage. A purified residual gas at a temperature of approximately 145° C. and containing an overall content of sulphur-containing products equal to 1000 ppm by volume was discharged via the conduit 29, connected to the exit of the said reactor and forming the exit of the catalytic purification unit 3, the said purified gas being conveyed towards the incinerator via the conduit 45. The incineration took place at 450° C. by burning a fuel gas with a slight excess of air resulting in 1% by volume of oxygen in the incinerated gas sent to the stack.

The purging gas employed for regenerating the sulphur-charged catalyst present in the reactor in the regeneration and then cooling stage consisted of a part of the cooled oxidised and hydrolysed residual gas taken from the conduit 38 via the first pipe and was introduced into the reactor in a regeneration stage after having been brought to a temperature of between 300° C. and 350° C. in the heater 34 of the regeneration circuit. The sulphur-charged purging gas originating from the reactor in a regeneration stage then entered the sulphur condenser 31 of the regeneration circuit to be cooled therein to approximately 125° C. so as to separate off by condensation most of the sulphur which it contained, and then returned to the heater 34 to be reemployed for regeneration. The regenerated catalyst was then cooled to a temperature of approximately 130° C. by passing through the reactor which contained it the purging gas originating from the condenser 31 and travelling in the branch 35 bypassing the heater 34.

The catalytic reactors 18 and 19 operated alternately for 30 hours in a purification stage, that is to say in a reaction stage, and for 30 hours, including 10 hours' cooling, in a regeneration/cooling stage.

The sulphur yield of the complex comprising the sulphur plant, the oxidation and hydrolysis unit and the catalytic purification unit was 99.7%.

We claim:

1. In a process for improving the sulphur yield of a complex producing sulfur from a sour gas containing $H_2S$, the complex comprising (1) a sulfur plant into which the sour gas is introduced together with a controlled quantity of a gas containing free oxygen and in which a controlled oxidation of the $H_2S$ in the sour gas by means of the oxygen in the gas containing free oxygen is performed to produce sulphur and at the exit of which there is discharged a residual gas containing steam and, in an overall quantity of approximately between 0.2 and 6% by volume, sulphur compounds comprising $H_2S$, $SO_2$ and at least one of the derivatives COS and $CS_2$, (2) an oxidation and hydrolysis unit in which the residual gas originating from the sulphur plant is brought into contact with a catalyst for hydrolysis of the compounds: COS and $CS_2$ to $H_2S$ while operating at a sufficient temperature to produce a hydrolyzed residual gas containing $H_2$ and $SO_2$ and substantially free from COS and $CS_2$ and finally (3) a purification unit through which the residual gas originating from the oxidation and hydrolysis unit is passed after the temperature of the said gas has been brought to the value required for its passage through the purification unit and while maintaining the molar ratio $H_2S:SO_2$ in the residual gas entering the purification unit at a value substantially equal to 2:1, and the compounds $H_2S$ and $SO_2$ which it contains being made to react together to form sulphur and to obtain a purified residual gas at the exit of the purification unit, the improvement which comprises (a) maintaining the $H_2S:SO_2$ molar ratio in the residual gas originating from the sulphur plant and entering the oxidation and hydrolysis unit at a value equal to or higher than 2:1 by varying the ratio of the flow rates of sour gas and of gas containing free oxygen which are introduced into the sulphur plant; (b) introducing a second gas stream containing free oxygen into the gas stream from the sulfur plant entering the oxidation and hydrolysis unit and oxidizing $H_2S$ to $SO_2$ and sulphur in the unit by contacting the gas stream with a catalyst for oxidation of the $H_2S$; and (c) maintaining the $H_2S:SO_2$ molar ratio in the residual gas entering the purification unit at a value substantially equal to 2:1 by varying the flow rate of the gas stream containing free oxygen introduced into the oxidation and hydrolysis unit.

2. Process according to claim 1, wherein the reactions of oxidation of $H_2S$ and of hydrolysis of the compounds COS and $CS_2$ in the oxidation and hydrolysis unit are carried out at temperatures of between 180° C. and 700° C.

3. Process according to claim 1 wherein the residence time of the reaction mixture containing the residual gas originating from the sulphur plant and the second gas stream containing free oxygen in contact with the catalyst present in the oxidation and hydrolysis unit, expressed under normal conditions of pressure and temperature, ranges from 0.5 to 10 seconds and more particularly from 1 to 6 seconds.

4. Process according to claim 1, wherein the residual gas originating from the sulphur plant and the second gas stream containing free oxygen are delivered to the oxidation and hydrolysis unit either separately or in the form of a mixture.

5. Process according to claim 1, wherein the oxidation and hydrolysis unit contains a catalyst for simultaneously promoting oxidation of $H_2S$ with oxygen to $SO_2$ and hydrolysis of the compounds COS and $CS_2$ to $H_2S$.

6. Process according to claim 5, wherein the catalyst present in the oxidation and hydrolysis unit contains at least 50% by weight of an activated alumina.

7. Process according to claim 6, wherein the said catalyst consists of an activated alumina.

8. Process according to claim 6 wherein the alumina-based catalyst present in the oxidation and hydrolysis unit has a specific surface, determined by the BET method, ranging from 5 $m^2/g$ to 400 $m^2/g$ 9. A process according to claim 5, wherein the catalyst present in the oxidation and hydrolysis unit is selected from the group consisting of a) catalysts resulting from the combination of at least one compound of a metal chosen from Fe, Ni, Co, Cu, Zn, Cr and Mo with an alumina and/or silica support and b) catalysts resulting from the combination of at least one compound of a metal chosen from Fe, Cu, Cd, Zn, Cr, Mo, W, V, Co, Ni and Bi with a silica and/or titanium oxide support or a support comprising a heat stabilized activated alumina and c) catalysts resulting from the combination of at least one compound of a metal selected from Fe, Cu, Cd, Zn, Cr, Mo, W, V, Co, Ni and Bi and at least one compound of a noble metal selected from the group consisting of Pd, Pt, Ir and Rh with a silica and/or titanium oxide support or heat-stabilized activated alumina.

10. Process according to claim 5, wherein the catalyst present in the oxidation and hydrolysis unit contains titanium oxide.

11. Process according to claim 5, wherein the catalyst present in the oxidation and hydrolysis unit contains titanium oxide and a sulphate of an alkaline-earth metal chosen from Ca, Sr, Ba and Mg.

12. Process according to claim 11, wherein the weight proportion of titanium oxide, expressed as $TiO_2$, to the weight proportion of alkaline-earth metal sulphate in the catalyst, in the calcined state, ranges from 99:1 to 60:40.

13. Process according to claim 10, wherein the catalyst containing titanium oxide has a specific surface, measured by the BET method, of between 5 $m^2/g$ and 400 $m^2/g$.

14. Process according to claim 1, wherein the $H_2S:SO_2$ molar ratio in the residual gas originating from the sulphur plant and delivered to the oxidation and hydrolysis unit has a value higher than 2:1 which is proportionately higher the lower the $H_2S$ content of the residual gas originating from the sulphur plant, and does not result, during the oxidation of $H_2S$ in the oxidation and hydrolysis unit, in a temperature rise liable to damage the ,catalyst present in the said unit.

15. Process according to one of claim 1, wherein the maintenance of the $H_2S:SO_2$ molar ratio at the desired value in the residual gas originating from the sulphur plant and delivered to the oxidation and hydrolysis unit is obtained by keeping constant the flow of sour gas introduced into the sulphur plant and by varying the flow of the gas containing free oxygen introduced into the said sulphur plant.

16. Process according to claim 15, wherein the maintenance of the said $H_2S:SO_2$ molar ratio at the chosen value equal to or higher than 2:1 is obtained by analysing the residual gas originating from the sulphur plant and delivered to the oxidation and hydrolysis unit to determine its molar contents of $H_2S$ and $SO_2$ and by producing, starting with the said contents, a quantity representing the instantaneous value of the said $H_2S:SO_2$ molar ratio and then by establishing a quantity representing the correction flow rate of the second gas containing free oxygen to bring the said instantaneous value to the chosen value and by employing the quantity thus determined to adjust the flow of the gas containing free oxygen which is introduced into the sulphur plant.

17. A process according to claim 1 wherein the maintenance of the $H_2S:SO_2$ molar ratio at the value of 2:1 in the oxidized and hydrolyzed residual gas entering the purification unit is obtained by analyzing the residual gas to determine a molar content of $H_2S$ and $SO_2$ and producing a quantity representing the instantaneous value of the $H_2S:SO_2$ molar ratio; generating a signal representative of a flow rate of the second gas stream containing free oxygen to bring the instantaneous value of the molar rate of $H_2S:SO_2$ to the value of 2:1 and by employing the signal to adjust the flow of the free oxygen containing second gas stream introduced into the oxidation and hydrolysis unit.

18. Process according to claim 1, wherein the reactions of oxidation of $H_2S$ and of hydrolysis of the compounds COS and $CS_2$ in the oxidation and hydrolysis unit are carried out at temperatures of between 250° C. and 400° C.

19. Process according to claim 6 wherein the alumina-based catalyst present in the oxidation and hydrolysis unit has a specific surface, determined by the BET method, ranging from 40 $m^2/g$ to 250 $m^2/g$.

20. Process according to claim 11, wherein the weight proportion of titanium oxide, expressed as $TiO_2$, to the weight proportion of alkaline-earth metal sulphate in the catalyst, in the calcined state, ranges from 99:1 to 80:20.

21. Process according to claim 10, wherein the catalyst containing titanium oxide has a specific surface, measured by the BET method, of between 10 $m^2/g$ and 250 $m^2/g$.

22. A process for producing sulfur from a sour gas containing $H_2S$, with an improved sulfur yield, which comprises:

(a) continuously introducing the sour gas and a first quantity of a gas containing free oxygen into a sulfur plant to produce sulfur and a residual gas stream containing from about 0.2% to about 6% by volume sulfur compounds comprising $H_2S$, $SO_2$, in a molar ratio not less than about 2 and at least one of COS and $CS_2$;

(b) continuously introducing the residual gas stream from the sulfur plant and a second quantity of a gas containing free oxygen into a catalytic oxidation and hydrolysis zone wherein the residual gas stream and the second quantity of the free oxygen containing gas are maintained at a temperature sufficient to hydrolyze the COS and $CS_2$ in the residual gas stream and to oxidize a portion of the $H_2S$ to $SO_2$ and sulfur, to provide a hydrolyzed gas stream, substantially free of COS and $CS_2$, and containing $H_2S$ and $SO_2$ in a molar ratio of substantially 2:1;

(c) continuously cooling and introducing the hydrolyzed gas stream from the oxidation and hydrolysis zone into a purification zone wherein the $H_2S$ and $SO_2$ in the hydrolyzed gas stream are reacted in the presence of a catalyst to form sulfur and a purified residual gas stream.

* * * * *